(12) United States Patent
Wübbels

(10) Patent No.: US 6,699,130 B2
(45) Date of Patent: Mar. 2, 2004

(54) SLIP CLUTCH

(75) Inventor: Richard Wübbels, Rhede (DE)

(73) Assignee: Maschinenfabrik Kemper GmbH & Co. KG, Stadtlohn (DE)

( * ) Notice: Subject to any disclaimer, the term of this patent is extended or adjusted under 35 U.S.C. 154(b) by 0 days.

(21) Appl. No.: 10/219,014

(22) Filed: Aug. 14, 2002

(65) Prior Publication Data
US 2002/0193164 A1 Dec. 19, 2002

Related U.S. Application Data

(62) Division of application No. 09/695,336, filed on Oct. 24, 2000, now Pat. No. 6,470,658.

(30) Foreign Application Priority Data

Oct. 27, 1999 (DE) .......................................... 199 51 644

(51) Int. Cl.[7] ................................................. F16D 7/02
(52) U.S. Cl. ........................ 464/17; 464/48; 192/113.31
(58) Field of Search .............................. 464/17, 42–48; 192/113.1, 113.31

(56) References Cited

U.S. PATENT DOCUMENTS

| | | |
|---|---|---|
| 1,953,510 A | 4/1934 | Schultz et al. |
| 2,618,136 A | 11/1952 | Wellauer |
| 2,852,118 A * | 9/1958 | Lacroix, Jr. et al. .... 192/113.31 |
| 2,872,794 A | 2/1959 | Slomer |
| 2,909,258 A | 10/1959 | Lacroix, Jr. |
| 3,488,980 A | 1/1970 | Burrough |
| 3,600,877 A | 8/1971 | McCrary et al. |
| 4,566,579 A * | 1/1986 | Johnson |
| 5,129,497 A | 7/1992 | Kelley |
| 5,749,208 A | 5/1998 | Wuebbels et al. |

FOREIGN PATENT DOCUMENTS

| | | |
|---|---|---|
| EP | 0 057 807 | 8/1982 |
| FR | 1 191 235 | 10/1959 |
| FR | 2 488 775 | 2/1982 |

OTHER PUBLICATIONS

Database WPI, Section PQ, Week 199311 Derwent Publications Ltd., London, GB, Class Q63, AN 1993–092446 ZP002161013 & SU A 726 864 A (Refrig Equip Des Cons Techn Inst) Apr. 15, 1992.

* cited by examiner

Primary Examiner—Greg Binda

(57) ABSTRACT

A self-propelled forage harvester has a relatively wide mowing implement attached to its forward end and including right and left hand rotary mowing and drawing in drums together with right and left hand rotary conveying drums. A drive transmission for driving these drums includes a pair of identical slip cluthes having respective first sections defined in principal part by a fluid tight cylindrical container having opposite end plates and through the respective centers of which a drive element extends, with the drive element of one clutch being coupled to the drive element of the other clutch by a central drive shaft assembly. The clutches include respective second sections which are in the form of a housing which has a ring-like hub at one end adapted for being coupled to an associated righ-angle transmission unit that is in turn coupled for driving the mowing and drawing in drums at that side. The first and second sections of each clutch are drivingly interconnected by a pair of friction disks mounted for rotation with the second section and respectively biased into friction locked engagement with the opposite end plates forming part of the continer by a spring assembly mounted in an end of the housing remote from the ring-like hub.

5 Claims, 3 Drawing Sheets

SLIP CLUTCH

This application is a divisional application of application Ser. No. 09/695,336, filed 24 Oct. 2000 now U.S. Pat. No. 6,470,658.

The invention concerns an agricultural implement for attachment to a tractor or similar self-propelled vehicle, in particular a mowing machine for the mowing of grass, cereal or other grain crops.

BACKGROUND OF THE INVENTION

In the course of rationalization of the harvesting operation, agricultural implements with large operating widths are applied in conjunction with correspondingly high powered tractors. This applies particularly to mowing machines, for the mowing of grass and other grain crops, such as, in particular, corn, that are applied as front attachment implements for a tractor equipped with a chopper. The rotating tools here consist of intake and mowing drums, with which the crop is mowed and subsequently conducted to the chopper. In this case the operating gearbox of the tractor that drives the drive arrangement for the intake and mowing drums is formed by the central gearbox or the mowing height gear box of the chopper. Such forage harvesters employ high-powered motors up to 500 PS (metric horsepower) where correspondingly high drive power must be applied to the intake and mowing drums that are employed as rotating tools, of which several may be arranged on both sides of the vertical longitudinal center plane of the machine. Since the intake and mowing arrangements operating as rotating tools form large masses that must be accelerated for the initial acceleration of the mower, the drive arrangement of the tools is equipped with at least one slipping clutch as initial acceleration clutch and simultaneously as a safety clutch by means of which the torque transmitted between the drive shaft on the part of the vehicle and the drive arrangement of the rotating tools is limited in a manner known in itself.

In practical application in operation of such large agricultural implements, it has been shown that the maximum torque that can be transmitted by the slipping clutch during initial acceleration of the machine is frequently exceeded, if the initial acceleration on the part of the tractor is performed with a wide open throttle, contrary to the operating instructions of the manufacturer of the machine, instead of gradually increasing the application of the accelerator or gas pedal. The slipping clutch then slips under certain circumstances for several seconds before a friction locking is established through the spring-loaded, ring-shaped friction disks. During the slippage periods, large amounts of heat is generated in the slipping clutches, which are usually configured as dry clutches, that lead to overheating of the friction surfaces, in particular if the initial acceleration, if necessary, must be repeated several times. The forces that can be transmitted by the clutch components are thereby continuously reduced so that the clutch can become inoperative after only a relatively short operating time.

SUMMARY OF THE INVENTION

According to the present invention, there is provided an improved drive for a large mowing machine of the type described above.

An object of the invention is to provide a drive having improved initial acceleration characteristics which are applicable for use in harvesting operations in machines of the type indicated above.

A more specific object of the invention is to provide a drive embodying a slip clutch having a first section in the form of a hub configured as a ring-shaped container filled with fluid, with ring-shaped friction disks being engaged with end plates forming part of the container and mounted on a second clutch section for rotation with the second section which defines a housing surrounding the container, the fluid acting to absorb heat so that over-heating of the friction disks due to improper performance of the starting or initial acceleration process of the implement is largely avoided. The cooling fluid, such as water, contained in the ring-shaped container not only absorbs the heat generated by the clutching process, but conducts it to the surroundings over heat exchange surfaces provided by the ring-shaped container. In this way a considerable increase in the durability of the slip clutch is attained.

DESCRIPTION OF THE PREFERRED EMBODIMENT

Figure 1:
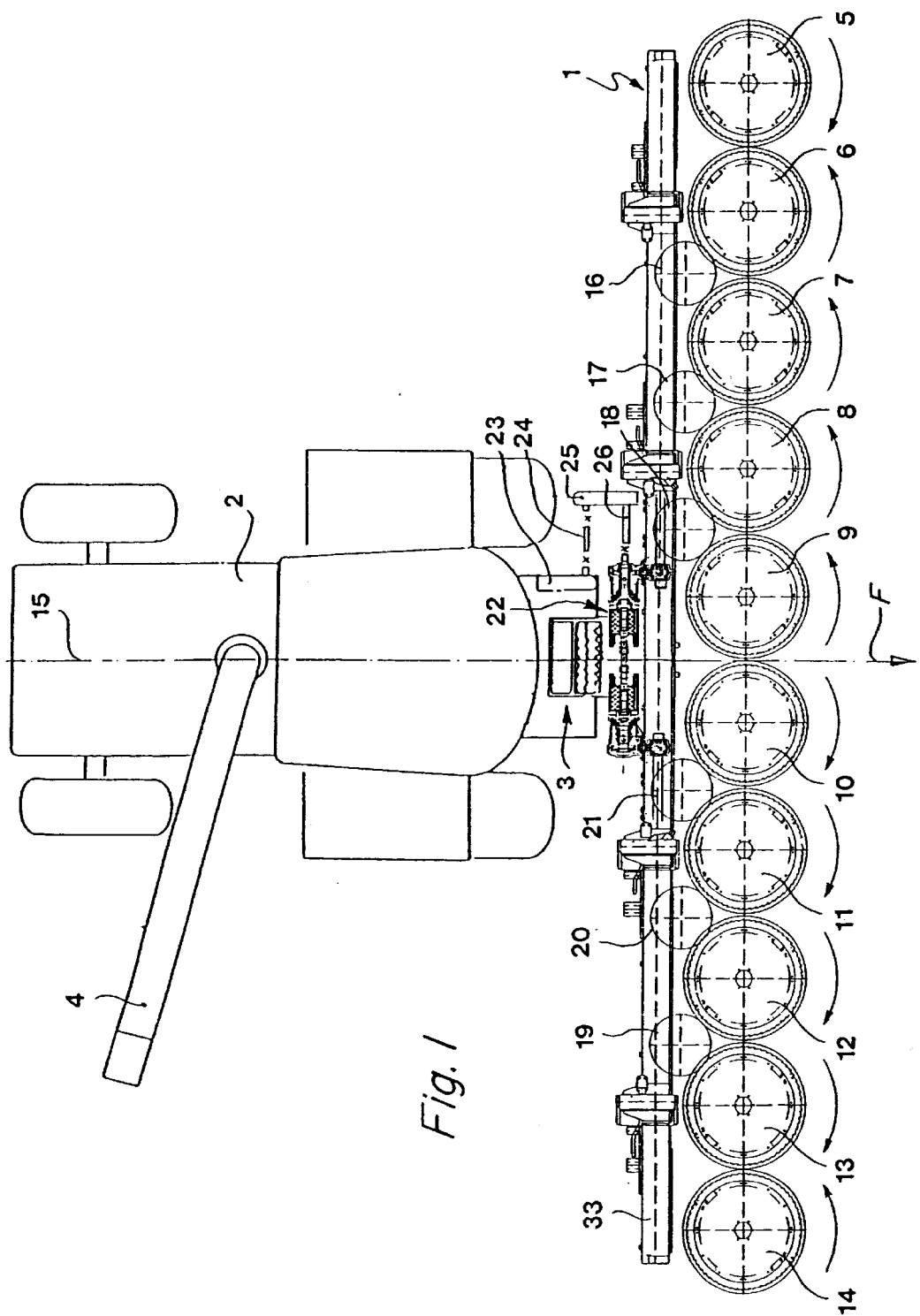
FIG. 1 is a plan view of a machine for mowing corn and similar stalk-like crop in connection with a chopper.

Preliminarily, it is to be noted that the terms "left" and "right" are to be considered relative to an observer standing behind, and facing in the direction of forward travel of, the machine illustrated in FIG. 1.

Referring now to FIG. 1, there is shown an agricultural implement in the form of a mowing implement or machine 1 attached to a tractor or similar self-propelled vehicle, here shown as a self-propelled forage harvester 2, for the mowing of corn and similar stalk-like crops. The forage harvester 2 includes a chopper 3 that is arranged centrally with respect to the mowing implement 1. The cut crop is conducted over intake rolls to a chopper blower, not shown in any further detail, in which it is chopped into short lengths and then conveyed over an exhaust duct 4 to a mobile container such as an agricultural self-loading forage box, for example.

The mowing machine 1, is moved forward by the vehicle 2 in the direction of operation or driving according to the arrow F, and, in the embodiment shown, includes a total of ten rotating tools in the form of intake and mowing drums 5 through 14, respectively, with the drums 5 through 9 being arranged at the left side of a vertical, longitudinal center plane 15 of the machine, and the drums 10 through 14 being arranged at the right side of the center plane 15. The two groups of intake and mowing drums 5 through 9, on the one hand, and 10 through 14, on the other hand, are arranged in a mirror image symmetrically about the longitudinal center plane 15. In addition, further conveyor drums 16, 17 and 18 are located behind the neighboring intake and mowing drums 6 through 9 for further conveying of the crop cut by these drums and the drum 5 as well, while further conveyor drums 19, 20 and 21 are located behind the neighboring intake and mowing 10 through 13, for further handling of the crop cut by these drums and the drum 14 as well.

For driving the rotary tools in the form of the intake and mowing drums 5 through 14 as well as the conveying drums 16 through 21, the mowing machine 1 is equipped with a drive arrangement, designated in its entirety by the numeral 22, coupled to a gearbox 23 on the part of the vehicle that, in the embodiment shown, is formed by the central or mowing height gearbox of the chopper 3. From the operating gearbox 23, the drive is transmitted over an articulated shaft 24 to a gearbox 25 and from this over an articulated shaft 26 to the drive arrangement 22.

Figure 2:
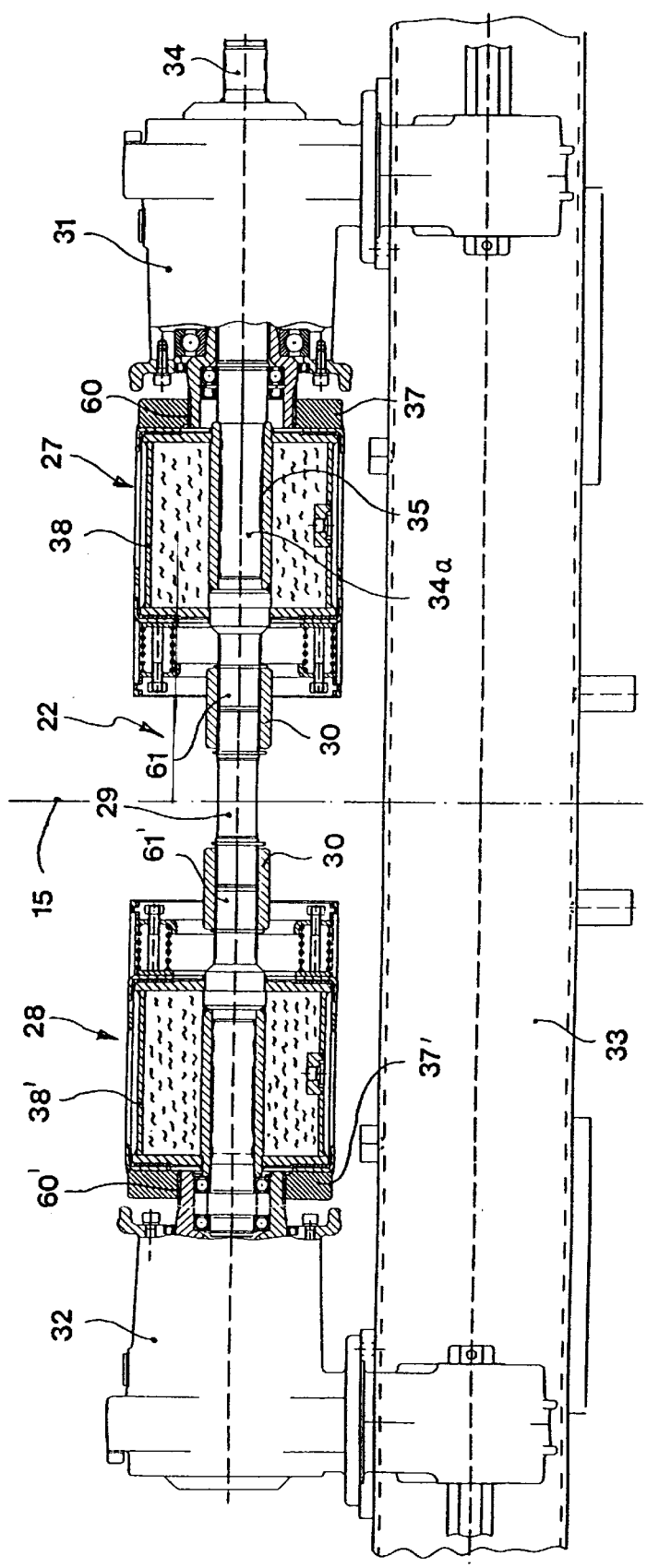
FIG. 2 is an enlarged, partial section of a plan view of the region of the drive arrangement of the mowing machine of FIG. 1.

In the embodiment shown, the drive arrangement 22 includes a clutch arrangement acting as a safety device while transferring torque during initial acceleration, the clutch arrangement being in the form of two clutches 27 and 28 that are rigidly connected with each other over a connecting shaft 29 with sleeve couplings 30. The two clutches 27 and 28 are configured identically and are arranged as mirror images symmetrically to each other on opposite sides of the vertical longitudinal center plane 15. The clutches 27 and 28 are respectively connected with angled gear boxes 31 and 32 that transmit the drive taken from the tractor 2 to respective shaft drive-lines (not shown) supported in bearings, free to rotate, in a frame tube 33 for the drive of the left half of the machine with the intake and mowing drums 5 through 9, or the right half of the machine with the intake and mowing drums 10 through 14. For its part, the frame tube 33 is fastened to a base frame of the mowing machine 1 in a manner not shown in any further detail. Furthermore, as can be seen in FIG. 2, a shaft section 34 of the articulated shaft 26 continues through the gear box 31 and extends at 34a into the clutch 27 in which it is retained by a multi-edge connection 35 with an axial play for movement.

Since the two clutches 27 and 28 are identical in design, their configuration shall be explained in greater detail below only on the basis of the clutch 27 together with the enlarged view in FIG. 3. Accordingly, the clutch 27 includes a first clutch section defining a first clutch hub configured as a container 38 enclosed on all sides that includes a cylindrical inner sleeve 39 providing a hub opening 36 that accepts the stub shaft 34a of the drive shaft section 34 on the part of the vehicle introduced into the clutch 27. The container 38 also includes an outer sleeve or cylindrical wall 40 that is joined to opposite, parallel end plates 43 and 44 so as to define an annular, space 41, that is filled with cooling fluid, such as water, and is closed on all sides except for a fill opening provided in the outer sleeve 40, which opening is closed after completion of the filling process by a threaded plug 42 and a sealing ring so that the space 41 is fluid tight. The cylindrical sleeve 39 extends through the center of, and is fixed to, the end plate 43 and has an end which terminates within the container 38.

The clutch 27 further includes a second clutch section in the form of a clutch housing 37 including an end plate or hub 58 having an opening 59 provided with internal splines or a multi-wedge connection 60 through which the drive connection to the angled gearbox 31 is made for driving the rotary tools on that side of the vehicle.

Respectively located on the outside of the end plates 43 and 44 of the container 38 are ring-shaped or annular friction disks 45 and 46 that are respectively rigidly connected with ring-shaped or annular driver disks or backing plates 47 and 48. The rigid connection of the ring-shaped friction disks 45 and 46 with the ring-shaped driver disks 47 and 48 can be performed by mechanical connecting links, by bonding, by spraying with friction disk material or any other appropriate manner. The clutch housing 37 is configured so as to define a cylindrical enclosure or sleeve 50 that encompasses the container 38 and includes a housing portion extending axially beyond the end plate 44. Guide sockets or tabs 49 form part of and are angled at right angles from the remaining portions of the driver disks or backing plates 47 and 48 and are retained in circumferential guide slots provided in the cylindrical enclosure or sleeve 50 so as to extend parallel to the axis of rotation and to provide axial play for the disks 47 and 48 and also for coupling the friction disks 47 and 48 for rotation with the cylindrical enclosure 50. Otherwise, the cylindrical enclosure 50 is configured as a grating with openings 51, that improve the dissipation of heat from the ring-shaped container 38.

The friction disks 45 and 46 are spring loaded for effecting a drive connection that is a function of the torque between the ring-shaped container 38 forming the clutch hub and the clutch housing 37. This spring loading is provided by a ring-shaped spring package or assembly 52, mounted within and to the portion of the clutch housing 37 that extends axially beyond the end plate 44, the spring package 52 consisting of a ring of individual helical compression springs 53 whose line of force is parallel to a rotational axis R of the clutch. The ring of springs 53 are supported at their opposite end faces respectively by retaining rings 54 and 55, with the ring 54 bearing against the driver disk or backing plate 48 to which the friction disk 45 is fixed.

The compression of the compression springs 53 and thereby the maximum torque controlled by the contact pressure of the friction disks 45 and 46 at which the clutch 27 slips is adjusted by an adjustment ring 56 that is provided with detent cams 57 for a locking engagement in aperture openings of the clutch housing 37. Here, two or several rings and aperture openings are preferably provided that are spaced from one another in the direction of the clutch axis R, that are spaced for their part in the circumferential direction corresponding to the detent cams 57 of the adjustment ring 56. In the installed condition, the adjustment ring 56 is positioned with its inner end in contact with an outer face of the retaining ring 55, and thereby determines in the installed condition the pressure force, depending on which aperture opening engages a locking cam 57. As long as an adjustment of the torque through the package of compression springs 52 can be omitted, obviously a single ring of aperture openings in the clutch housing 37 would be sufficient for the locking of the adjustment ring 56.

The end plate or hub 58 of the housing 37 is located on the opposite end of the housing from the adjustment ring 56 and, together with the end plate 43 of the container 38, sandwiches the backing plate 47 with the friction disk 45. With the container 38 being mounted for shifting axially relative to the housing 37, the force exerted by the compression springs 52 acts to establish the predetermined force of frictional engagement between the friction disk 45 and the container end plate 43.

At its end opposite the introduction opening for the stub drive shaft 34a, the inner sleeve 39 is rigidly connected, for example welded to a coaxial stub shaft 61. Furthermore, the stub shaft 61 is rigidly connected or welded to the end plate 44 of the ring-shaped container 38. The same goes for the end plate 43 with respect to the inner sleeve 39. The stub shaft 61 extends through the spring package 52 to the connecting shaft 29, with which it is connected over the sleeve coupling 30. The connection with sleeve coupling 30 is again performed by a multi-wedge or spline connection.

Figure 3:
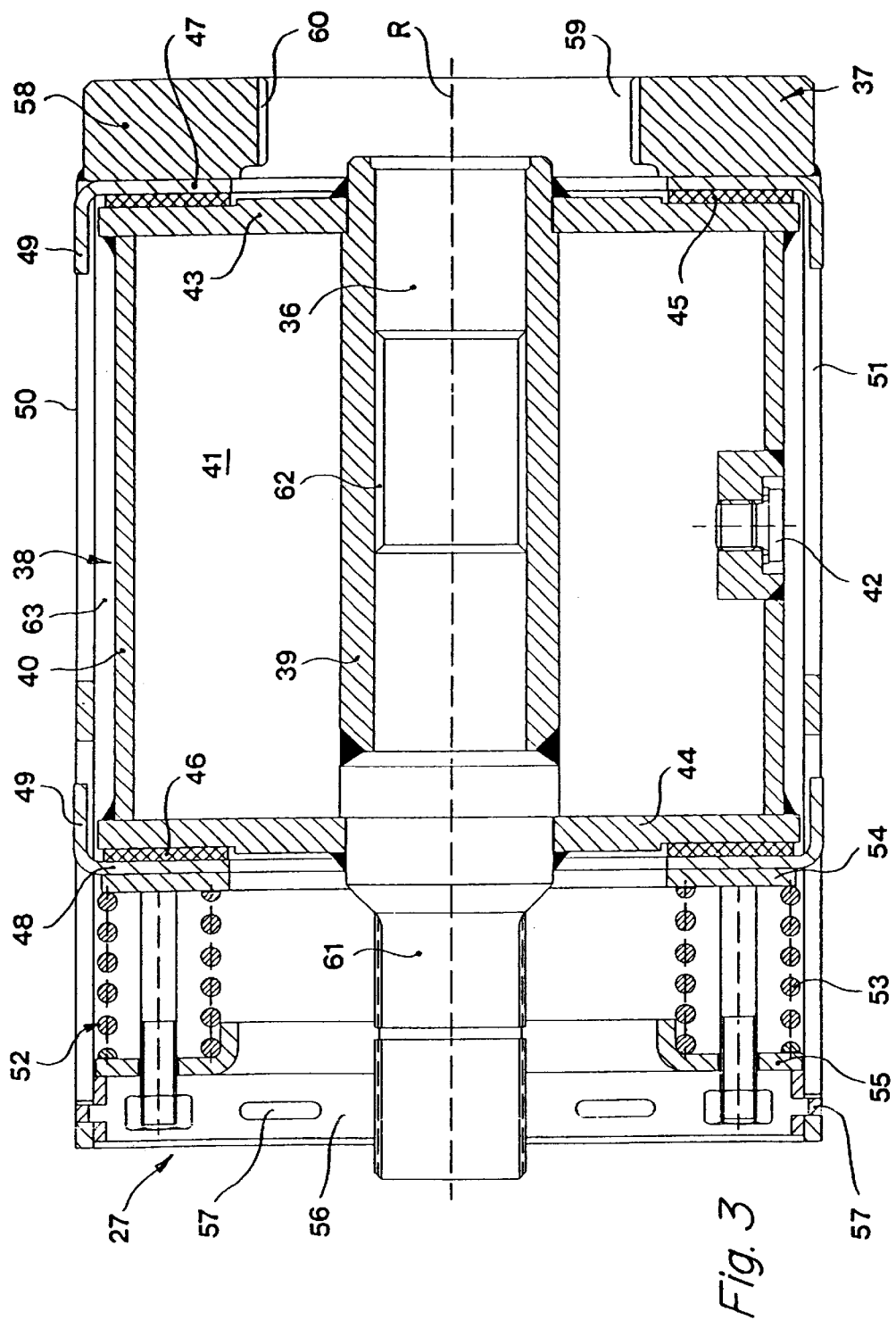
FIG. 3 is an enlarged, axial sectional view through a detail of the drive arrangement according to FIG. 2.

Furthermore, an arrangement of the grooves and ribs 62 can be seen in FIG. 3 that is limited to the central region of the sleeve bore 36 which is configured for the multi-wedge connection 35 (FIG. 2) with the correspondingly configured stub shaft 34a of the shaft section 34.

When the arrangement is coupled, the power flows over the spring loaded friction disks 45 and 46 from the ring-shaped container 38, set into rotation by the drive shaft section 34, to the clutch housing 37, in particular, the end plate or hub 58 whose rotational movement is transmitted in turn through the multi-wedge connection 60 to the gearbox 31. Here the rotational drive is transmitted simultaneously over the stub shaft 61 to the connecting shaft 29 and from there over the stub shaft 61', that corresponds to the stub shaft 61, to the ring-shaped container 38' and the clutch housing 37' of the clutch 28 over the multi-wedge connection 60' to the angled gearbox 32.

If during the operation of the clutch 27, the predetermined torque is exceeded, then the clutch will slip, and a relative rotational movement will occur between the clutch housing 37 and the ring-shaped container 38 with sliding friction occurring at the respective interfaces between the ring-shaped disks 45 and 46 and the end plates 43 and 44 of the ring-shaped container 38. The relative rotational movement is made possible by the clutch housing 37 with its cylindrical sleeve or enclosure 50 that concentrically surrounds and is spaced from the ring-shaped container 38 so as to leave a circumferential ring shaped void 63. It will be appreciated that heat generated at the interface of the clutch friction disks 45 and 46 and the container end plates 43 and 44 will be dissipated by the liquid coolant carried inside the container 38. Further, the various slots or openings 51 in the enclosure 50 also help in the dissipation of heat generated when the clutch 27 slips.

What is claimed is:

1. A slip clutch for use in an agricultural implement, comprising:
   a) first and second clutch sections having a rotational axis;
   b) said first clutch section defining a fluid-tight container having opposite ends respectively defined by a first and second end plates disposed perpendicular to said axis and said second clutch section being located exteriorly of said fluid tight-container;
   c) a first and second friction disks being respectively mounted to said second clutch section for rotation therewith and for axial movement toward and away from said first and second end plates; and
   d) a biasing arrangement urging said first and second friction disks respectively into locked friction engagement with said first and second end plates with a predetermined engaging force, whereby, upon said slip clutch experiencing an overload, said first and second friction disks will respectively slip relative to said first and second end plates thus generating heat which is dissipated by liquid coolant contained in said fluid-tight container.

2. The slip clutch as defined in claim 1 wherein said second clutch section includes:
   a) a housing surrounding said fluid-tight container and having a housing portion extending axially beyond said second end plate;
   b) an annular spring retainer forming part of said biasing arrangement and being mounted within said housing portion of said housing; and
   c) a plurality of coil compression springs being mounted between said spring retainer and said first friction disk.

3. The slip clutch as defined in claim 1 wherein said second clutch section includes:
   a) a cylindrical housing spaced radially outward from said first clutch section and provided with a plurality of axially extending openings;
   b) an annular backing plate including a plurality of axially extending tabs respectively located in said plurality of axially extending openings; and
   c) said first friction disk being fixed to said annular backing plate, whereby said first friction disk is mounted for axial movement toward and away from said first end plate while being coupled for rotation with said second clutch section.

4. The slip clutch as defined in claim 1 wherein:
   a) said fluid-tight container is generally cylindrical;
   b) a cylindrical sleeve forms part of said container, extends through said first end plate and has opposite first and second ends respectively terminating inside said container and adjacent said first end plate;
   c) a stub shaft extends through said second end plate and is fixed to said first end of said sleeve and to said second end plate;
   d) said second clutch section includes a hub disposed in concentric relationship to said second end of the sleeve at a location outside said fluid-tight container;
   e) said stub shaft includes a section located outside said fluid-tight container and provided with connection splines about its exterior;
   f) said sleeve is provided with internal connection splines; and
   g) said hub is provided with connection splines on its interior, whereby said cylindrical sleeve is adapted for being connected to a power input shaft, said hub establishes an output adapted for being connected to a driven element and said stub shaft is adapted for transferring input power beyond said slip clutch.

5. The slip clutch as defined in claim 1 wherein:
   a) said fluid-tight container is generally cylindrical;
   b) said second clutch section includes a housing having a cylindrical wall disposed in concentric relationship to, and spaced from, said container so as to define an annular void between the container and the housing; and
   c) said cylindrical wall is provided with a plurality of openings for dissipating heat generated by relative movement between said first friction disk and said first end plate when the clutch is overloaded and slips.

\* \* \* \* \*